United States Patent
Shao et al.

(10) Patent No.: US 12,209,712 B2
(45) Date of Patent: Jan. 28, 2025

(54) METHODS AND SYSTEMS FOR SAFETY MANAGEMENT OF GAS PIPE WELLS BASED ON SMART GAS INTERNET OF THINGS

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Yuefei Wu, Chengdu (CN); Lei Zhang, Chengdu (CN); Xiaojun Wei, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/644,085

(22) Filed: Apr. 23, 2024

(65) Prior Publication Data
US 2024/0271762 A1    Aug. 15, 2024

(30) Foreign Application Priority Data
Mar. 29, 2024    (CN) .......................... 202410369960.9

(51) Int. Cl.
*F17D 5/00* (2006.01)
*G06N 20/00* (2019.01)
*G06Q 50/06* (2024.01)

(52) U.S. Cl.
CPC ............ *F17D 5/005* (2013.01); *G06N 20/00* (2019.01); *G06Q 50/06* (2013.01)

(58) Field of Classification Search
CPC ......... F17D 5/005; G06N 20/00; G06Q 50/06
See application file for complete search history.

(56) References Cited

U.S. PATENT DOCUMENTS 11,879,599 B2 *    1/2024    Shao ................. G06Q 10/20
11,898,895 B2 *    2/2024    Shao ................. G06Q 50/06
(Continued)

FOREIGN PATENT DOCUMENTS

CN    115899595 A    4/2023
CN    218845772 U    4/2023
(Continued)

OTHER PUBLICATIONS

First Office Action in Chinese Application No. 202410369960.9 mailed on May 8, 2024, 17 pages.
(Continued)

*Primary Examiner* — Eric Keasel
(74) *Attorney, Agent, or Firm* — METIS IP LLC (57) ABSTRACT

Disclosed is a method and a system for safety management of a gas pipe well based on a smart gas IoT. The method may be executed by a processor and include: obtaining an environmental information sequence of the gas pipe well and an in-well monitoring data sequence by controlling a monitoring component according to a monitoring parameter based on the smart gas IoT, and storing the environmental information sequence and the in-well monitoring data sequence in a storage unit; determining an in-well risk value; adjusting the monitoring parameter in response to determining that the in-well risk value exceeds a risk threshold and updating the in-well risk value; determining an impact degree of a gas component; determining a pipe well inspection program and generating a corresponding pipe well inspection instruction to be sent to an inspection terminal; and adjusting the monitoring parameter and clearing expired data in the storage unit.

10 Claims, 4 Drawing Sheets

(56) References Cited

U.S. PATENT DOCUMENTS

| | | | |
|---|---|---|---|
| 11,966,885 B2* | 4/2024 | Shao | G06Q 10/04 |
| 11,982,409 B2* | 5/2024 | Shao | F17D 5/005 |
| 11,982,613 B2* | 5/2024 | Shao | G01N 17/02 |
| 12,045,837 B2* | 7/2024 | Shao | F17D 5/005 |
| 2008/0127654 A1 | 6/2008 | Darling et al. | |
| 2023/0143654 A1 | 5/2023 | Shao et al. | |
| 2023/0160540 A1 | 5/2023 | Shao et al. | |

FOREIGN PATENT DOCUMENTS

| | | | |
|---|---|---|---|
| CN | 116308965 A | 6/2023 | |
| CN | 116485066 A | 7/2023 | |
| CN | 116506470 A | 7/2023 | |
| CN | 116629580 A | 8/2023 | |
| CN | 116645041 A | 8/2023 | |
| CN | 117495356 A | 2/2024 | |
| JP | H09243070 A | 9/1997 | |

OTHER PUBLICATIONS

Notification to Grant Patent Right for Invention in Chinese Application No. 202410369960.9 mailed on May 24, 2024, 4 pages.

First Office Action in Chinese Application No. 202410369960.9 mailed on May 8, 2024, 19 pages.

Zeng, Rui, Practice of Risk Assessment of Buried Steel Gas Pipeline, GAS & HEAT, 40(4): A39-A42, B44, 2020.

Li, Minghao et al., Risk Assessment of Buried PE Pipes for Gas, Petroleum and chemical equipment, 2017, 6 pages.

Shao, Zehua, Research on Smart Gas Meter Sensor Network Platform, GAS & HEAT, 38(5): B33-B37, 2018.

Gu, Xun'Ao, Risk analysis of urban gas pipeline and optimization of inspection strategy, CNKI, 2021, 8 pages.

Zhao, Fei et al., Gas Turbine Exhaust System Health Management Based on Recurrent Neural Networks, 11th CIRP Conference on Industrial Product-Service Systems, 83: 630-635, 2019.

* cited by examiner

```
┌─────────────────────────────────────────────────────────┐
│ Obtaining an environmental information sequence of a    │
│ gas pipe well and an in-well monitoring data sequence   │
│ by controlling a monitoring component according to a    │──── 210
│ monitoring parameter based on a smart gas IoT, and      │
│ storing the environmental information sequence of the   │
│ gas pipe well and the in-well monitoring data sequence  │
│ in a storage unit                                       │
└─────────────────────────────────────────────────────────┘
                            │
                            ▼
┌─────────────────────────────────────────────────────────┐
│ Determining an in-well risk value based on the          │──── 220
│ environmental information sequence and the in-well      │
│ monitoring data sequence                                │
└─────────────────────────────────────────────────────────┘
                            │
                            ▼
┌─────────────────────────────────────────────────────────┐
│ Adjusting the monitoring parameter in response to       │
│ determining that the in-well risk value exceeds a risk  │──── 230
│ threshold and updating the in-well risk value based on  │
│ the adjusted monitoring parameter                       │
└─────────────────────────────────────────────────────────┘
                            │
                            ▼
┌─────────────────────────────────────────────────────────┐
│ Determining an impact degree of a gas component based   │──── 240
│ on the updated in-well risk value                       │
└─────────────────────────────────────────────────────────┘
                            │
                            ▼
┌─────────────────────────────────────────────────────────┐
│ Determining a pipe well inspection program based on the │
│ impact degree of the gas component and generating a     │──── 250
│ corresponding pipe well inspection instruction to be    │
│ sent to an inspection terminal                          │
└─────────────────────────────────────────────────────────┘
                            │
                            ▼
┌─────────────────────────────────────────────────────────┐
│ Adjusting the monitoring parameter and clearing expired │
│ data in the storage unit based on an inspection result  │──── 260
│ on the pipe well inspection instruction by an inspector │
└─────────────────────────────────────────────────────────┘
```

METHODS AND SYSTEMS FOR SAFETY MANAGEMENT OF GAS PIPE WELLS BASED ON SMART GAS INTERNET OF THINGS

CROSS-REFERENCE TO RELATED APPLICATIONS

This application claims priority to Chinese Patent Application No. 202410369960.9, filed on Mar. 29, 2024, the entire contents of which are hereby incorporated by reference.

TECHNICAL FIELD

The present disclosure relates to the field of smart gas, and in particular to a method and a system for safety management of a gas pipe well based on a smart gas Internet of Things (IoT).

BACKGROUND

A gas pipe well is infrastructure used for managing, maintaining, and accessing an underground gas pipeline system. To ensure the safety of the gas pipe well, it is necessary to install a gas monitoring device inside the gas pipe well. Since the gas pipe well is constructed underground, the gas monitoring device is easily affected by an underground environment such as rainwater immersion and corrosion. The external environmental influences can cause an anomaly in the gas monitoring device, preventing normal monitoring and reducing a service life of the monitoring device.

To ensure normal operation of the gas monitoring device in the gas pipe well, Chinese Application No. CN218845772U discloses a gas well leak online monitoring device with a waterproof structure. By covering the monitoring device with a protective cover at a top of the device, waterproof protection is provided. However, this solution only provides waterproof protection for the monitoring device and does not prevent or effectively monitor other risks.

Therefore, it is desirable to provide a method and a system for safety management of a gas pipe well based on an Internet of Things (IoT) to enhance the management and monitoring of the gas monitoring device and improve the reliability, safety, and maintainability of the gas pipe well.

SUMMARY

One or more embodiments of the present disclosure provide a method for safety management of a gas pipe well based on a smart gas Internet of Things (IoT). The method may be executed by a processor, and the method may include: obtaining an environmental information sequence of the gas pipe well and an in-well monitoring data sequence by controlling a monitoring component according to a monitoring parameter based on the smart gas IoT, and storing the environmental information sequence of the gas pipe well and the in-well monitoring data sequence in a storage unit; determining an in-well risk value based on the environmental information sequence and the in-well monitoring data sequence; adjusting the monitoring parameter in response to determining that the in-well risk value exceeds a risk threshold and updating the in-well risk value based on the adjusted monitoring parameter; determining an impact degree of a gas component based on the updated in-well risk value; determining a pipe well inspection program based on the impact degree of the gas component and generating a corresponding pipe well inspection instruction to be sent to an inspection terminal; and adjusting the monitoring parameter and clearing expired data in the storage unit based on an inspection result on the pipe well inspection instruction by an inspector.

One or more embodiments of the present disclosure provide a system for safety management of a gas pipe well based on a smart gas Internet of Things (IoT). The system may include a smart gas user platform, a smart gas service platform, a smart gas device management platform, a smart gas sensing network platform, and a smart gas object platform. The smart gas device management platform may be configured to: obtain an environmental information sequence of a gas pipe well and an in-well monitoring data sequence by controlling a monitoring component according to a monitoring parameter based on the smart gas IoT, and store the environmental information sequence of the gas pipe well and the in-well monitoring data sequence in a storage unit; determine an in-well risk value based on the environmental information sequence and the in-well monitoring data sequence; adjust the monitoring parameter in response to determining that the in-well risk value exceeds a risk threshold and update the in-well risk value based on the adjusted monitoring parameter; determine an impact degree of a gas component based on the updated in-well risk value; determine a pipe well inspection program based on the impact degree of the gas component and generate a corresponding pipe well inspection instruction to be sent to an inspection terminal; and adjust the monitoring parameter and clear expired data in the storage unit based on an inspection result of the pipe well inspection instruction by an inspector.

One or more embodiments of the present disclosure provide a non-transitory computer-readable storage medium. The storage medium may store one or more sets of computer instructions, and when a computer reads the one or more sets of computer instructions in the storage medium, the computer executes the method for safety management of the gas pipe well based on the smart gas IoT.

The beneficial effects of one or more embodiments of the present disclosure may include, but are not limited to: by assessing the in-well risk value, determining the impact degree of the gas component based on the in-well risk value, and thereby determining the pipe well inspection program, it is possible to effectively assess a potential risk in the gas pipe well and determine the pipe well inspection priority based on the severity of the impact of the risk. At the same time, it is also possible to promptly anticipate potential risks, issue early warnings, dynamically adjust the pipe well inspection program, and ensure the safe use of the gas pipe well.

DETAILED DESCRIPTION

The accompanying drawings, which are required to be used in the description of the embodiments, are briefly described below. The accompanying drawings do not represent the entirety of the embodiments.

As indicated in the present disclosure and in the claims, unless the context clearly suggests an exception, the words "one," "a," "an," and/or "the" do not refer specifically to the singular but may also include the plural. In general, the terms "include", "includes", "including", "comprise", "comprising", and/or "comprise" suggest only the inclusion of clearly identified operations and elements, which do not constitute an exclusive list, and the method or device may also include other operations or elements.

A gas pipe well is generally provided with a variety of monitoring components to monitor conditions such as a water level, a gas leakage, etc., inside the gas pipe well. However, the monitoring components may be affected by rain immersion, corrosion, temperature abnormalities, etc., which leads to abnormal monitoring functions, thus affecting normal monitoring operations and reducing the service life of the monitoring components.

In view of the foregoing, some embodiments of the present disclosure provide a method and a system for safety management of a gas pipe well based on a smart gas Internet of Things (IoT), which can manage the gas pipe well, promptly prevent potential risks such as immersion and corrosion, reduce abnormal conditions of the monitoring components caused by environmental factors, ensure the normal operation of monitoring functions, and safeguard the safety of a gas pipeline network.

Figure 1:
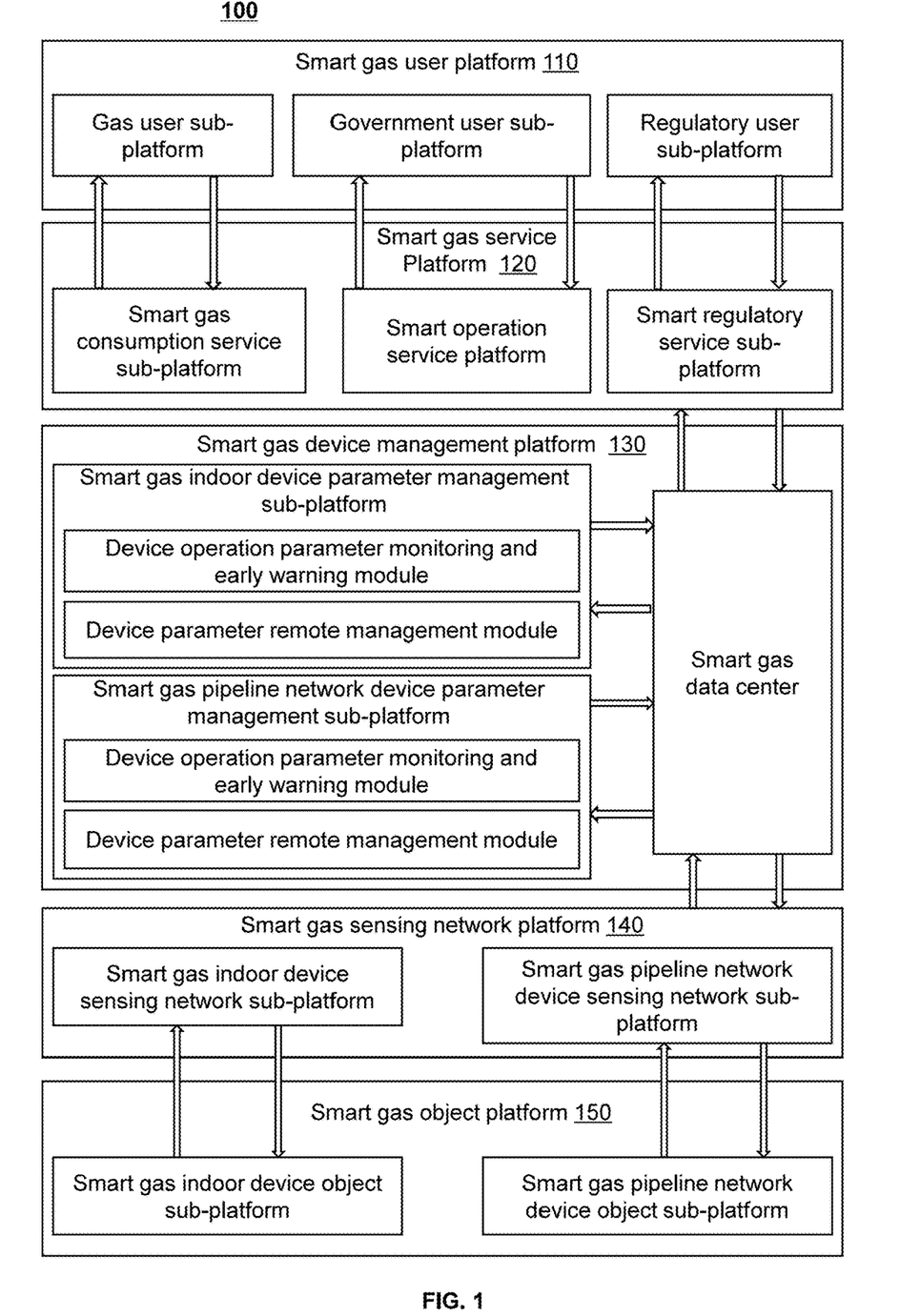
FIG. 1 is a schematic diagram illustrating platforms of an exemplary system for safety management of a gas pipe well based on a smart gas Internet of Things (IoT) according to some embodiments of the present disclosure.

FIG. 1 is a schematic diagram illustrating platforms of an exemplary system for safety management of a gas pipe well based on a smart gas Internet of Things (IoT) according to some embodiments of the present disclosure. It should be noted that the following embodiments are used only for explaining the present disclosure and do not constitute a limitation of the present disclosure.

As shown in FIG. 1, a system 100 for safety management of a gas pipe well based on a smart gas IoT may include a smart gas user platform 110, a smart gas service platform 120, a smart gas device management platform 130, a smart gas sensing network platform 140, and a smart gas object platform 150.

The smart gas user platform 110 is a platform for interacting with a user. In some embodiments, the smart gas user platform 110 may be configured as a terminal device.

In some embodiments, the smart gas user platform 110 may include a gas user sub-platform, a government user sub-platform, and a regulatory user sub-platform.

The gas user sub-platform is a platform configured to provide a gas user with data related to gas usage and a solution to a gas problem. The government user sub-platform is a platform configured to provide gas operation data to a government user. The regulatory user sub-platform is a platform for a regulatory user to regulate an operation of the entire IoT system.

The smart gas service platform 120 is a platform for communicating user demand and/or control information. In some embodiments, the smart gas service platform 120 may receive a query instruction sent by the smart gas user platform 110 and issue the query instruction to the smart gas device management platform 130. In some embodiments, the smart gas service platform 120 may send a pipe well inspection instruction to the smart gas user platform 110.

In some embodiments, the smart gas user platform 120 may include a smart gas consumption service sub-platform, a smart operation service platform, and a smart regulatory service sub-platform.

The smart gas consumption service sub-platform is a platform configured to provide a gas service to a gas user. The smart operation service platform is a platform configured to provide a government user with gas operation related information (e.g., an environmental information sequence of gas pipe wells, an in-well monitoring data sequence, etc.). The smart regulatory service sub-platform is a platform configured to provide a regulatory need to a regulatory user.

The smart gas device management platform 130 is a platform configured to coordinate and harmonize the connection and collaboration between various functional platforms, aggregate all information of the IoT, and provide functions of perception management and control management for an operation of the IoT.

In some embodiments, the smart gas device management platform 130 may include a smart gas data center, a smart gas indoor device parameter management sub-platform, and a smart gas pipeline network device parameter management sub-platform.

Each of the smart gas indoor device parameter management sub-platform and the smart gas pipeline network device parameter management sub-platform may include a device operation parameter monitoring and early warning module and a device parameter remote management module. The device operation parameter monitoring and early warning module allows viewing of historical and real-time data of a device operation parameter and monitoring and warning based on a preset threshold. When the device operation parameter is abnormal (e.g., exceeding the corresponding preset threshold), management personnel may switch directly from the device operation parameter monitoring and early warning module to the device parameter remote management module for remote processing of the device operation parameter, and initiate a reminder message to a user via the smart gas service platform 120 if necessary. Through the device parameter remote management module, the management personnel may remotely set and adjust the device operation parameter of the smart gas object platform 150, and remotely grant authorization for an adjustment of the device operation parameter initiated on-site by the smart gas object platform 150.

In some embodiments, the smart gas device management platform 130 may be configured to obtain an environmental information sequence of the gas pipe well and an in-well monitoring data sequence by controlling a monitoring component according to a monitoring parameter based on the smart gas IoT, store the environmental information sequence of the gas pipe well and the in-well monitoring data sequence in a storage unit, determine an in-well risk value based on the environmental information sequence and the in-well monitoring data sequence, and adjust the monitoring parameter in response to determining that the in-well risk value exceeds a risk threshold and update the in-well risk value based on the adjusted monitoring parameter. The smart gas device management platform 130 may be further configured to determine an impact degree of a gas component based on the updated in-well risk value, determine a pipe well inspection program based on the impact degree of the gas component and generate a corresponding pipe well inspection instruction to be sent to an inspection terminal, and adjust the monitoring parameter and clear expired data in the storage unit based on an inspection result of the pipe well inspection instruction by an inspector. The smart gas data center may be configured to store and manage at least part of operation information of the system 100 for safety management of the gas pipe well based on the smart gas IoT. In some embodiments, the smart gas data center may be configured as a storage device for storing data related to the gas pipe well, for example, the environmental information sequence of the gas pipe well, the in-well monitoring data sequence, etc.

In some embodiments, the smart gas device management platform 130 may interact with the smart gas service platform 120, and the smart gas sensing network platform 140 through the smart gas data center, respectively, for information exchange. For example, the smart gas data center may issue a query instruction for the monitoring data of the gas pipe well to the smart gas sensing network platform 140, and receive relevant data uploaded by the smart gas sensing network platform 140. As another example, the smart gas device management platform 130 may send a pipe well inspection instruction to the smart gas service platform 120.

In some embodiments, the smart gas indoor device parameter management sub-platform and the smart gas pipeline network device parameter management sub-platform may interact with the smart gas data center bidirectionally, respectively.

The smart gas indoor device parameter management sub-platform and the smart gas pipeline network device parameter management sub-platform respectively include the device operation parameter monitoring and early warning module and the device parameter remote management module. Through the device operation parameter monitoring and early warning module, historical and real-time data of the device operation parameter may be viewed, and monitoring and early warning may be conducted based on the preset threshold. When the device operation parameter is abnormal (e.g., exceeding the corresponding preset threshold), the management personnel may switch directly from the device operation parameter monitoring and early warning module to the device parameter remote management module for remote processing of the device operation parameter, and, if necessary, initiate a reminder message to the user via the smart gas service platform 120. Through the device parameter remote management module, the management personnel may remotely set and adjust the device operation parameter of the smart gas object platform 150 and remotely grant authorization for an adjustment of the device operation parameter initiated on-site by the smart gas object platform 150.

The smart gas sensing network platform 140 is a functional platform for managing sensing communications. In some embodiments, the smart gas sensing network platform 140 may be configured as a communication network and a gateway.

In some embodiments, the smart gas sensing network platform 140 may include a smart gas indoor device sensing network sub-platform and a smart gas pipeline network device sensing network sub-platform for obtaining operation information of a gas indoor device and a gas pipeline network device, respectively.

The smart gas object platform 150 may be a functional platform for sensing information generation and controlling information execution. For example, the smart gas object platform 150 may monitor and obtain the operation information of monitoring components (e.g., temperature sensors, humidity sensors, etc.) deployed inside and outside the pipe well.

In some embodiments, the smart gas object platform 150 may include a smart gas indoor device object sub-platform and a smart gas pipeline network device object sub-platform. The smart gas indoor device object sub-platform may be configured as various types of gas indoor devices of the gas user. The smart gas pipeline network device object sub-platform may be configured as various types of gas pipeline devices and monitoring devices. In some embodiments, the smart gas pipeline network device object sub-platform may be configured to obtain the environmental information of the gas pipe well and the in-well monitoring data.

The system 100 for safety management of the gas pipe well based on the smart gas IoT can form a closed loop of information operation between the functional platforms and operate regularly under the unified management of the smart gas device management platform, realizing information-based and intelligent smart gas well management.

Figure 2:
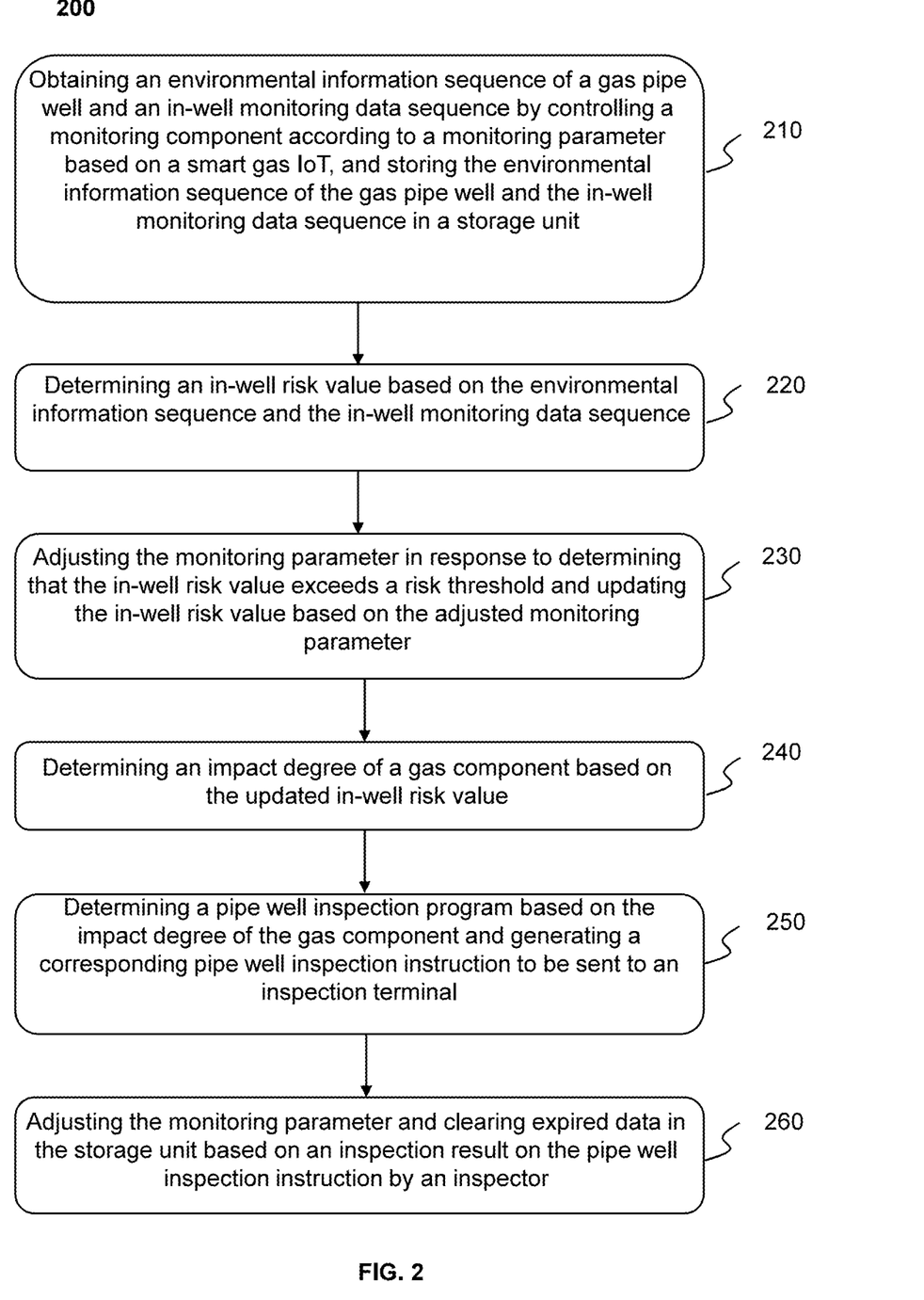
FIG. 2 is a flowchart illustrating an exemplary process of a method for safety management of a gas pipe well based on a smart gas IoT according to some embodiments of the present disclosure.

FIG. 2 is a flowchart illustrating an exemplary process of a method for safety management of a gas pipe well based on a smart gas IoT according to some embodiments of the present disclosure. In some embodiments, process 200 may be performed by a smart gas device management platform. As shown in FIG. 2, process 200 includes the following operations.

In 210, obtaining an environmental information sequence of the gas pipe well and an in-well monitoring data sequence by controlling a monitoring component according to a monitoring parameter based on the smart gas IoT, and storing the environmental information sequence of the gas pipe well and the in-well monitoring data sequence in a storage unit.

The monitoring component refers to a component that has a monitoring function. In some embodiments, the monitoring component may include temperature sensors, humidity sensors, or the like deployed inside and outside of the gas pipe well.

In some embodiments, the monitoring component may further include a gas content sensor or the like deployed inside the gas pipe well.

In some embodiments, monitoring data acquired by the monitoring component deployed outside the gas pipe well is environmental information, and monitoring data acquired by the monitoring component deployed inside the gas pipe well is in-well monitoring data. The environmental information may include a temperature, a humidity, weather information, or the like of a region where the gas pipe well is located. The in-well monitoring data refers to information related to an interior of the gas pipe well. For example, the in-well monitoring data may include data such as a temperature, a humidity, a gas content, or the like inside the gas pipe well.

In some embodiments, the environmental information may also be obtained in other feasible ways. For example, the smart gas device management platform may obtain weather information via the Internet. As another example, the smart gas device management platform may obtain weather information via a visual sensor, or the like.

In some embodiments, a plurality of monitoring components may be deployed in multiple monitoring point locations. In some embodiments, the monitoring point locations may be set within a distance range outside the gas pipe well, and/or at different height ranges inside the gas pipe well. For example, the monitoring point locations may be set around multiple directions outside the gas well and/or around multiple height ranges on the well wall inside the gas well. The positioning of the monitoring points may be adjusted according to actual needs, which is not limited in the present disclosure.

The monitoring parameter is an indicator parameter of a monitoring effort of the monitoring component. In some embodiments, the monitoring parameter may include a monitoring frequency of each of the monitoring point locations.

In some embodiments, the processor may determine the monitoring parameter based on a rate of change of the environmental information. For example, when the rate of change of the environmental information at a monitoring point location is higher, the monitoring frequency of the monitoring component deployed at the monitoring point location may be set higher. The rate of change of the environmental information refers to ta magnitude of change of the environmental information over a time period. The rate of change of the environmental information may be determined based on the environmental information sequence. For example, the processor may determine a value of change in the environmental information per unit time as the rate of change of the environmental information.

In some embodiments, the processor may also determine the monitoring parameter based on a deployment position of the monitoring point location. For example, the monitoring component deployed in a monitoring point location closer to the pipe well is set to have a higher monitoring frequency, while the monitoring component deployed in a monitoring point location further away from the pipe well is set to have a lower monitoring frequency.

The environmental information sequence refers to a sequence of multiple pieces of environmental information acquired at different time points. The multiple pieces of environmental information in the environmental information sequence may be arranged in a chronological order.

The in-well monitoring data sequence refers to a sequence consisting of multiple pieces of in-well monitoring data acquired at different time points. The multiple pieces of in-well monitoring data in the in-well monitoring data sequence may be arranged in a chronological order.

In 220, determining an in-well risk value based on the environmental information sequence and the in-well monitoring data sequence.

The in-well risk value is a parameter value used to measure a risk profile of an in-well risk factor within a gas pipe well. A higher in-well risk value indicates a more severe risk profile or a higher probability of the in-well risk factor. The in-well risk factor refers to a type of risk that exists inside the gas pipe well.

In some embodiments, the in-well risk factor may include a well-wall immersion risk, a corrosion risk, or the like. In some embodiments, the in-well risk value may include a well-wall immersion risk value and a well-wall corrosion risk value.

The well-wall immersion risk value is a parameter value used to measure the well-wall water immersion risk. A higher well-wall immersion risk value indicates a higher likelihood of water ingress damage to a gas component deployed on a well wall.

The well-wall corrosion risk value is a parameter value used to measure the corrosion risk of the gas component. A higher corrosion risk value indicates a higher likelihood of corrosion of the gas component.

The gas component may include a monitoring component mounted on the wall of the pipe well, various components or devices on a gas pipeline, or the like.

In some embodiments, the processor may determine the in-well risk value in a variety of ways based on the environmental information sequence and the in-well monitoring data sequence. For example, the processor may construct a to-be-matched vector based on the environmental information sequence and the in-well monitoring data sequence, and determine the in-well risk value based on the to-be-matched vector by performing a vector matching in a vector database. The vector database includes a plurality of reference vectors and their corresponding submerged water conditions and corrosion conditions. In some embodiments, the processor may determine, based on the to-be-matched vector, reference vectors in the vector database that satisfy a preset matching condition, and determine the reference vectors that satisfy the preset matching condition as associated vectors. The processor may determine a ratio of a count of associated vectors with a water immersion situation to a total count of the associated vectors as the well-wall immersion risk value, and determine a ratio of a count of associated vectors with a corrosion situation to the total count of the associated vectors as the well-wall corrosion risk value. The reference vectors may be constructed based on a historical environmental information sequence and a historical in-well monitoring data sequence, and the water immersion situation and the corrosion situation corresponding to the reference vectors may be determined based on a historical inspection record. For example, when the historical inspection record records a situation such as "a water immersion mark of the gas component has been discolored", it may be determined that the gas component has the water immersion situation.

In some embodiments, the processor may also determine the well-wall corrosion risk value via a preset rule based on the in-well monitoring data sequence and the well-wall immersion risk value. In some embodiments, the well-wall corrosion risk value is positively correlated with temperature, humidity, impurities in the well, and the well-wall immersion risk value in the in-well monitoring data. In some embodiments, the preset rule may be that: the higher the temperature and humidity is, the higher the well-wall corrosion risk value is. In some embodiments, the preset rule may be that: the well-wall corrosion risk value is higher when the pipe well contains impurities such as sulfides. In some embodiments, the preset rule may be that: the well-wall corrosion risk value is higher when the well wall has a higher well-wall corrosion risk value. In such cases, the gas component and the monitoring component are more likely to come into direct contact with water, resulting in a higher corrosion risk value.

Figure 3:
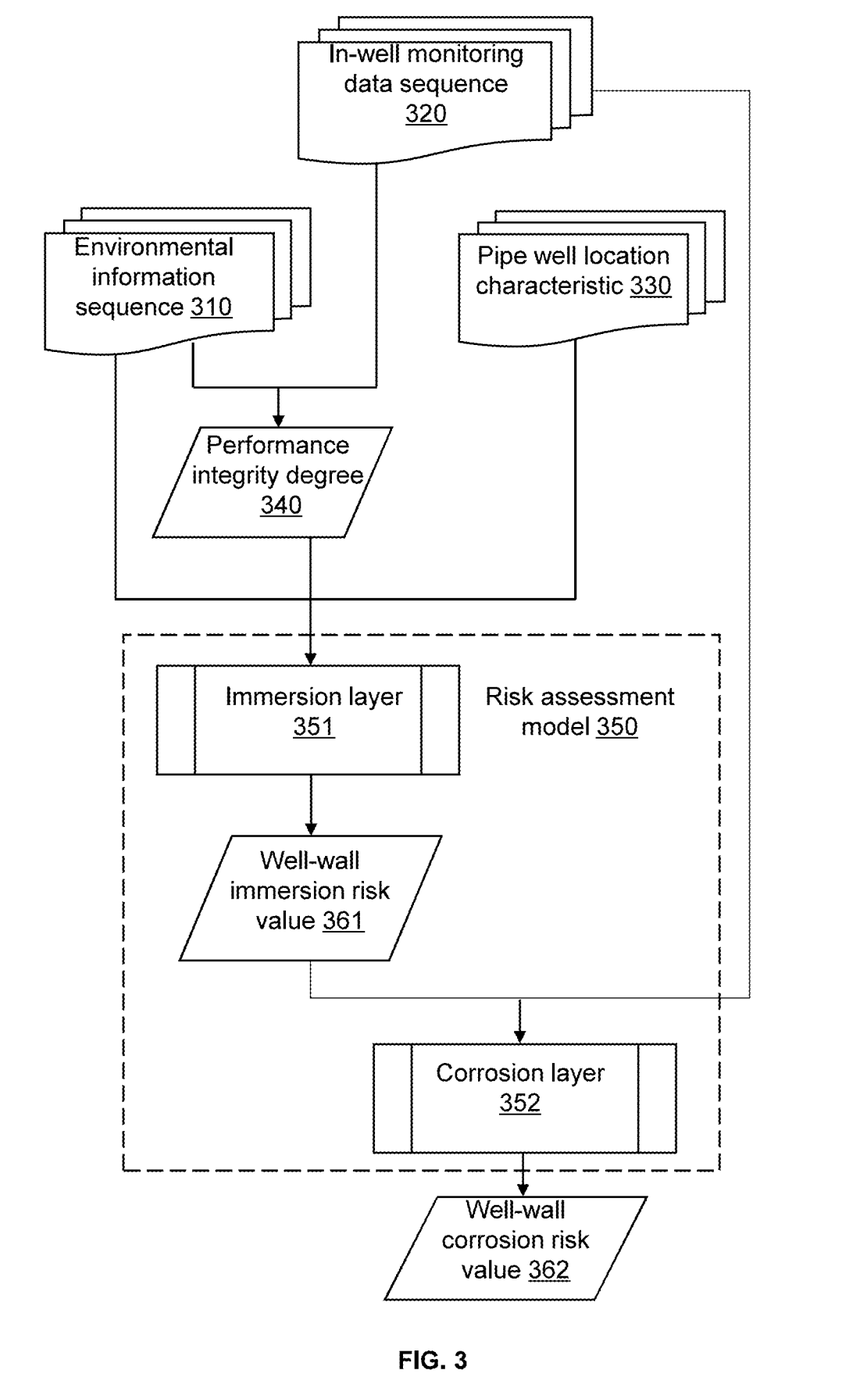
FIG. 3 is a schematic diagram illustrating determining of an in-well risk value according to some embodiments of the present disclosure.

More descriptions on determining the in-well risk value may be found in the description of FIG. 3.

In 230, adjusting the monitoring parameter in response to determining that the in-well risk value exceeds a risk threshold and updating the in-well risk value based on the adjusted monitoring parameter.

The risk threshold is a threshold associated with the in-well risk value. In some embodiments, the risk threshold may include a first risk threshold and a second risk threshold. The first risk threshold is a threshold associated with the well-wall immersion risk value. The second risk threshold is a threshold associated with the well-wall corrosion risk value. The risk threshold may be a system default value, an empirical value, a manually pre-set value, etc.

In some embodiments, the processor may adjust the monitoring parameter based on the in-well risk value. The processor may increase the monitoring frequency of at least some of the monitoring point locations when the well-wall immersion risk value exceeds the first risk threshold and/or the well-wall corrosion risk value exceeds the second risk threshold.

In some embodiments, in response to determining that the monitoring parameter has been adjusted, the processor may determine an updated in-well risk value based on the adjusted monitoring parameter. For example, the processor may, via the IoT, control the monitoring component to reacquire the environmental information sequence and the in-well monitoring data sequence of the gas pipe well according to the adjusted monitoring parameter and determine, based on the reacquired environmental information sequence and in-well monitoring data sequence, the in-well risk value, thereby determining the updated in-well risk value.

In 240, determining an impact degree of a gas component based on the updated in-well risk value.

The impact degree of the gas component is a degree to which the gas component is exposed to the in-well risk factor. Different gas components have different impact degrees resulting from the same in-well risk factor. For example, the gas component mounted to a well wall is affected to a higher degree by the risk of well wall immersion. As another example, a gas valve made of metal is subject to a higher level of corrosion risk.

The impact degree of the gas component may be determined in a variety of ways. In some embodiments, the processor may determine the impact degree of the gas component based on the well-wall immersion risk value and the well-wall corrosion risk value. For example, the processor may determine the impact degree I of the gas component based on the well-wall immersion risk value and the well-wall corrosion risk value by calculation using an equation (1):

$$I = k1*p1 + k2*p2 \qquad (1)$$

Wherein p1 and p2 denote the well-wall immersion risk value and the well-wall corrosion risk value, respectively, and k1 and k2 denote weight coefficients for the well-wall immersion risk value and the well-wall corrosion risk value, respectively. k1 and k2 may be determined based on a deployment location, a material, a duration of use, and intactness of the gas component during a last inspection. For example, the closer the gas component is to the well wall, the larger k1 is; the longer the duration of use of the gas component is, the larger k1 is; the more susceptible to corrosion the material of the gas component is, the longer the duration of use of the gas component is, and the lower the intactness of the gas component during the last inspection, the larger k2 is. The intactness of the gas component may be determined by input from an operational user.

In some embodiments, the processor may determine, based on the deployment location, the material, the duration of use, and the intactness of the gas component during the last inspection, the well-wall immersion risk value and the well-wall corrosion risk value by consulting a coefficient comparison table. The corresponding weight coefficients are determined by consulting the coefficient comparison table. In some embodiments, the coefficient comparison table may include one or more of the deployment location, the material, the duration of use, and the intactness of the gas component during the last inspection, and their corresponding relationships with the weight coefficients for the well wall water immersion risk value and the corrosion risk value. The coefficient comparison table may be preset by those skilled in the art based on experience or historical data. More descriptions on determining the impact degree of the gas component may be found in FIG. 4 and the related description thereof.

In 250, determining a pipe well inspection program based on the impact degree of the gas component and generating a corresponding pipe well inspection instruction to be sent to an inspection terminal.

The pipe well inspection program refers to a program for inspecting the gas components deployed inside and outside the gas pipe well. In some embodiments, the pipe well inspection program includes at least a next inspection time for the gas pipe well and an inspection intensity.

The next inspection time refers to a start and an end time of the next inspection for the gas pipe well. The inspection intensity refers to thoroughness of the inspection of the gas pipeline. For example, the greater the inspection intensity, the more details are required to be recorded on an inspection report. In some embodiments, different monitoring point locations and/or different gas components may correspond to different inspection intensities.

The pipe well inspection program may be determined in a variety of ways. In some embodiments, the processor may determine the pipe well inspection program based on the impact degree of the gas component and an impact threshold. The impact threshold is a threshold associated with the impact degree of the gas component. For example, in response to determining that an average of the impact degrees of a plurality of gas components in a gas pipe well exceeds the impact threshold, the processor may determine the gas pipe well as a target gas pipe well to be inspected, and determine that the next inspection time for the target gas pipe well is within a limit time period. The greater the average of the impact degrees of the plurality of gas components in the target gas pipe well, the greater the corresponding inspection intensity. The limit time period refers to a certain restricted time period. The limit time period may be determined by manual preset, system preset, etc. For example, the limit time period may be within two days.

In some embodiments, the processor may determine a pipe well inspection priority based on the impact degree of the gas component, and determine the pipe well inspection program based on the pipe well inspection priority.

The pipe well inspection priority is a sequence in which different gas pipelines are inspected.

In some embodiments, the processor may perform a weighted sum of the impact degrees of the plurality of gas components in the gas pipe well to determine the inspection priority of the gas pipe well. For example, the processor may directly determine a result of the weighted sum as the inspection priority of the gas pipe well. The greater the weighted result of the impact degrees of the plurality of gas components in the gas pipe well, the higher the inspection priority of the gas pipe well. In some embodiments, the processor may determine a weight of the weighted sum based on weatherability of the gas component. For example, a gas component with poorer weatherability is more susceptible to the in-well risk factor and corresponds to a higher weight.

Figure 4:
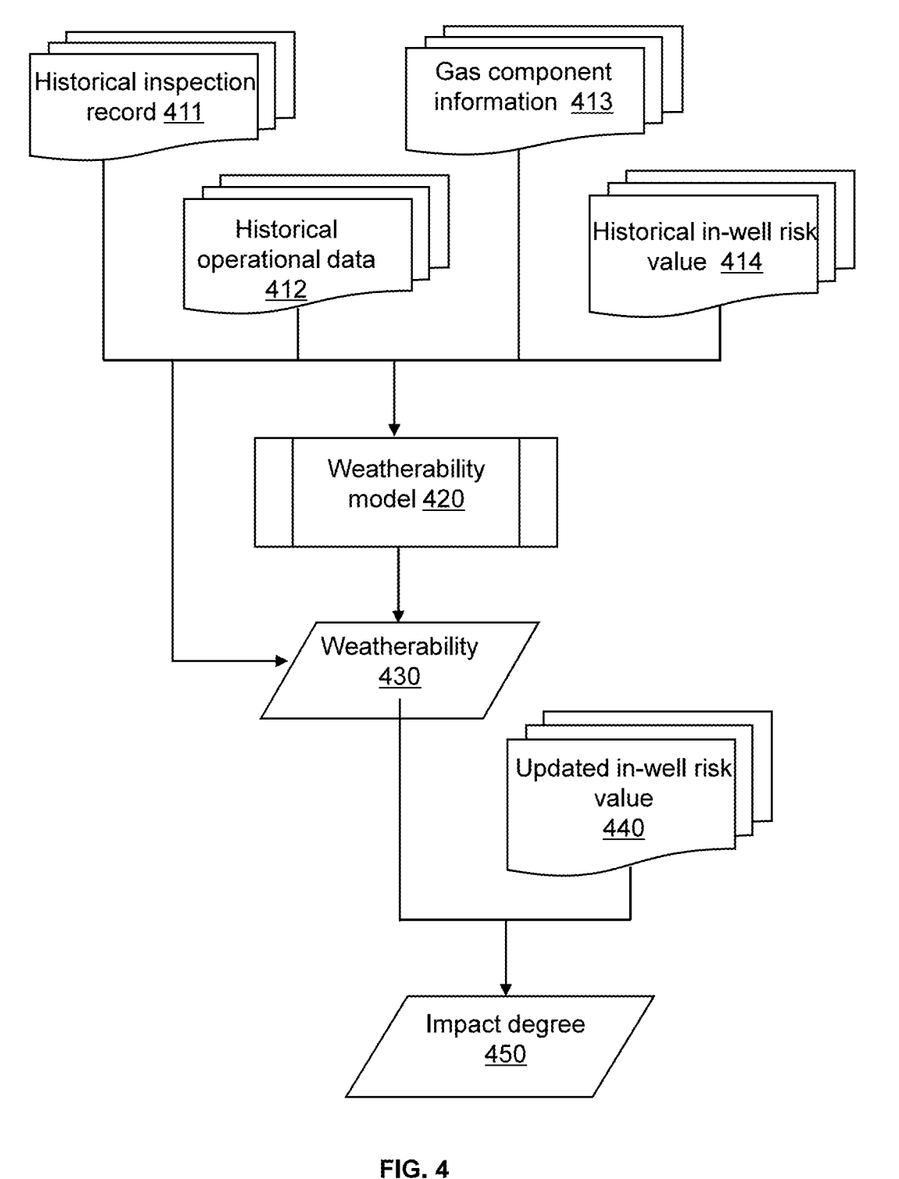
FIG. 4 is a schematic diagram illustrating determining of an impact degree of a gas component according to some embodiments of the present disclosure.

More descriptions of the weatherability may be found in FIG. 4 and the related descriptions thereof.

In some embodiments of the present disclosure, by weighting and summing the impact degrees of the plurality of gas components to determine the inspection priority of the gas pipe well, it may be possible to synthesize the impact degrees of the different gas components to comprehensively determine the risks that may exist in the gas pipe well, and timely inspect the gas pipe wells with high risk to effectively avoid the failure of gas components in the gas pipe wells.

In some embodiments, the processor may determine the pipe well inspection program based on the inspection priority for a plurality of target gas pipe wells. For example, when a target gas pipe well has a higher inspection priority, the next inspection time for the target gas pipe well may be set earlier, and the inspection intensity for the target gas pipe well may be set higher. The average of the impact degrees of the plurality of gas components in the target gas pipe well exceeds the impact threshold.

In some embodiments of the present disclosure, through the impact degree of the gas component, the pipe well inspection priority is determined, and based on the pipe well inspection priority, the pipe well inspection program is determined, so that it is possible to flexibly determine the impact degree of the risks on the plurality of gas component and dynamically adjust the monitoring parameter, inspection program, etc., of each gas component, thereby ensuring that the inspection program is timely and effective.

In some embodiments, the processor may also obtain a future environmental information sequence based on a weather forecast, determine a future impact degree of the gas component based on a future in-well risk value corresponding to the future environmental information sequence, and determine the pipe well inspection program based on the future impact degree.

The future environmental information sequence refers to a sequence reflecting environmental information in a future time period.

In some embodiments, the processor may match a similar historical environmental information sequence in historical data based on the future environmental information sequence, obtain a historical in-well risk value corresponding to the similar historical environmental information sequence, and designate the historical in-well risk value as the future in-well risk value. The similar environmental information sequence means that the data in the future environmental information sequence is mostly the same as data in the historical environmental information sequence. For example, a proportion of identical environmental data at each moment in the historical environmental information sequence to the corresponding moment in the future environmental information sequence exceeds eighty percent.

In some embodiments, the processor may determine the future impact degree of the gas component based on current weatherability of the gas component and the future in-well risk value, which is similar to the determination of the impact degree of the gas pipe well based on the updated in-well risk value of the gas component based on the gas component's weatherability, as will be described later.

In some embodiments, the processor may determine the pipe well inspection program based on the future impact degree of the gas component and the impact threshold. In some embodiments, the processor may determine the pipe well inspection priority based on a future impact degree of the gas component and determine the pipe well inspection program based on the pipe well inspection priority. More descriptions description may be found in the preceding related description.

In some embodiments of the present disclosure, the future impact degree of the gas component is determined based on the future in-well risk value corresponding to the future environmental information sequence. By determining the pipe well inspection program based on the future impact degree, it is possible to predict, to a certain extent, a future risk based on historical data, thereby facilitating proactive preventive measures and better safeguarding the safety of the gas pipeline.

The pipe well inspection instruction refers to an instruction issued by the processor to an inspector for conducting an inspection task. The inspector is an individual responsible for conducting the inspection task.

In some embodiments, the processor may send a gas pipeline well requiring inspection to an inspection terminal via the pipe well inspection instruction based on the pipe well inspection program, and arrange the inspector for inspection. The inspection terminal refers to a terminal device used by the inspector or an operational user. The operational user refers to a relevant user responsible for gas operation. For example, the operational user may be a gas company, etc. The operational user may be responsible for scheduling the inspector and arranging the inspection task for the inspector.

In some embodiments, the processor may, based on the amount of inspection tasks of different inspectors, send the inspection instruction to the inspection terminal of the inspector who has the least amount of inspection tasks at present. In some embodiments, the processor may first send the inspection instruction to the inspection terminal of the operational user, the operational user performs task assignment, and the operational user sends the assigned inspection instruction to the inspection terminal of the corresponding inspector.

In 260, adjusting the monitoring parameter and clearing expired data in the storage unit based on an inspection result on the pipe well inspection instruction by the inspector.

The inspection result is information recorded by the inspector after conducting an inspection of the gas pipe well. In some embodiments, the inspection result may include the inspection of water immersion, whether the gas component is operating normally, the corrosion of the gas component, or the like.

In some embodiments, the processor may adjust the monitoring parameter based on the inspection result. For example, when the inspection result indicates a case of water immersion, or the corrosion of a gas component is aggravated, the monitoring frequency of the monitoring component in the monitoring point location close to the water immersion position or the monitoring frequency of the corroded component may be adjusted upward accordingly.

The expired data is data information that has expired and is not useful. For example, the expired data may include environmental information and in-well monitoring data monitored prior to each inspection completion.

In some embodiments, the processor may clear the expired data in the storage unit after each inspection is completed, avoiding subsequent use of the expired data that may lead to a misjudgment.

In some embodiments of the present disclosure, by evaluating the in-well risk value and determining the impact degree of the gas component based on the in-well risk value, the pipe well inspection program can be established effectively, allowing for the assessment of a potential risk in the gas pipeline well and the determination of the inspection priority of the gas pipe well based on severity of the risk. At the same time, it is also possible to timely predict the potential risk and provide an early warning, dynamically adjusting the inspection program to ensure the safe usage of the gas pipe well.

FIG. 3 is a schematic diagram illustrating determining of an in-well risk value according to some embodiments of the present disclosure.

Referring to FIG. 3, in some embodiments, a processor may determine a performance integrity degree 330 of a gas pipe well based on an environmental information sequence 310 and an in-well monitoring data sequence 320, and determine the in-well risk value through a risk assessment model 350 based on the performance integrity degree 330, a pipe well location characteristic 340, the environmental information sequence 310, and the in-well monitoring data sequence 320. More descriptions of the environmental information sequence and the in-well monitoring data sequence may be found in FIG. 2 and the related descriptions thereof.

The performance integrity degree of the gas pipe well refers to a degree to which the gas pipe well is insulated from outside influences. For example, if it is raining outside the pipe well, and the water level and humidity inside the pipe well rise significantly, then the performance of a gas component inside the pipe well is susceptible to an environmental impact, and thus the performance integrity degree of the gas pipe well is lower in this case.

In some embodiments, the processor may determine the performance integrity degree of the gas pipe well in a variety of ways based on the environmental information sequence and the in-well monitoring data sequence. For example, the processor may determine the performance integrity degree of the gas pipe well based on a similarity between data corresponding to a time period in the environmental information sequence and data corresponding to the same time period in the in-well monitoring data sequence. The lower the similarity between the data corresponding to the same time period, the higher the performance integrity degree. Merely by way of example, a lower similarity between environmental temperature and humidity data in the environmental information sequence and the corresponding temperature and humidity data inside the well at the same time indicates that the pipe well is less affected by external influences, and the performance integrity degree of the gas pipe well is higher. The similarity may be a Euclidean distance, a cosine similarity, or the like.

In some embodiments, the processor may determine consistency of changes between an environment inside the gas pipe well and an environment outside the gas pipe well based on the environmental information sequence and the in-well monitoring data sequence, and determine the performance integrity degree based on the consistency of changes.

The consistency of changes refers to a degree of conformity between changes in the environment outside the gas pipe well and changes in the environment inside the gas pipe well. The higher the consistency of changes, the higher the degree of conformity between the changes in the environment outside the gas pipe well and the changes in the environment inside the gas pipe well, indicating that the outside environment affects the environment inside the gas pipe well.

In some embodiments, the processor may determine a difference in changing time and/or changing magnitude between the environment inside the gas pipe well and the environment outside the gas pipe well based on the environmental information sequence and the in-well monitoring data sequence, and determine the difference corresponding to the changing time and/or the changing magnitude as the consistency of changes.

The changing time refers to a time point when the environmental information or the in-well monitoring data changes. For example, the changing time may be a time point when the temperature begins to drop, a time point when the humidity begins to rise, a time point when rain begins to fall, etc.

The changing magnitude refers to an extent of change in the environmental information or the in-well monitoring data compared to data at a previous time point. For example, the changing magnitude may be the degree of change in the temperature and humidity compared to the temperature and humidity collected at the previous time point.

In some embodiments, the processor may segment the environmental information sequence to obtain a plurality of environmental information sub-sequences based on a characteristic of changes of the environment outside the gas pipe well in the environmental information sequence, determine, based on the plurality of environmental information sub-sequence and the in-well monitoring data sequence, a plurality of in-well monitoring data sub-sequences corresponding to the plurality of environmental information sub-sequences, respectively, and determine the consistency of changes based on a matching degree between the plurality of environmental data sub-sequences and the plurality of in-well monitoring data sub-sequences.

The characteristic of changes of the environment outside the gas pipe well is a characteristic associated with the environmental change outside the pipe well. For example, the characteristic of changes of the environment outside the gas pipe well may include the changing time, the changing magnitude, etc., of environmental information such as temperature, humidity, etc., outside the pipe well. In some embodiments, the processor may perform feature extraction on the environmental information sequence to obtain the characteristic of changes of the environment outside the gas pipe well of the environmental information sequence. The embodiments of the present disclosure do not have any special limitation on the way of feature extraction, and operations known to those skilled in the art may be used.

In some embodiments, the processor may determine, based on the characteristic of changes of the environment outside the gas pipe well, a time point at which the changing magnitude in temperature and humidity exceeds a temperature threshold and a humidity threshold and a time point at which a weather transition occurs as segmentation points. Based on the segmentation points, the processor may segment the environmental information sequence to obtain the plurality of environmental information sub-sequences.

In some embodiments, the processor may, based on a change characteristic of one of the plurality of environmental information sub-sequences with respect to a preceding and a following neighboring environmental information sub-sequences, match the environmental information sub-sequence with an in-well monitoring data sequence in the corresponding time period, and determine the in-well monitoring data sub-sequence corresponding to the environmental information sub-sequence. In some embodiments, the processor may determine, based on the change characteristic of the environmental information sub-sequence, an in-well monitoring data sequence for which a similarity of the change characteristic is higher than a similarity threshold in the in-well monitoring data sequence in the corresponding time period. The processor may determine the in-well monitoring data sequence as the in-well monitoring data sub-sequence corresponding to the environmental information sub-sequence. For example, if the change characterized of an environmental information sub-sequence is a decrease in temperature, an increase in humidity, and a change from sunny to rainy, as compared to the previous environmental information sub-sequence, segments of environmental monitoring data sequences with similarity of change characteristic exceeding the similarity threshold may be matched in the corresponding time period of the in-well monitoring data sequence, and determined as the in-well monitoring data sub-sequence. The similarity of the change characteristic may be determined based on a vector distance. The similarity threshold may be a system preset value, a human preset value, or the like.

In some embodiments, the processor may further determine a time duration similarity between the environmental information sub-sequence and the matched in-well monitoring data sub-sequence, and determine, based on the time duration similarity versus the similarity of the change characteristic, a matching degree between the environmental information sub-sequence and the matched in-well monitoring data sub-sequence based on the time duration similarity and the similarity of the change characteristic. The time duration similarity may be determined based on a vector distance. The matching degree may be a weighted result of the time duration similarity and the similarity of the change characteristic, and a weight may be determined based on historical data.

Considering that the impact of the environment outside the pipe well on the environment inside the pipe well may have a delay, the corresponding time period of the environmental information sub-sequence described above may refer to a time period in which the environmental information sub-sequence is located and to a time period thereafter.

Since the changing magnitude in the environmental information in some of the plurality of environmental information sub-sequences is not significant relative to the previous environmental information sub-sequence, which may not affect the environment inside the gas pipe well. As a result, not every environmental information sub-sequence can be matched the corresponding in-well monitoring data sub-sequence, and when the environmental information sub-sequence does not match the in-well monitoring data sub-sequence, the corresponding matching degree is 0.

In some embodiments, the processor may determine the consistency of changes based on the matching degree between the plurality of environmental information sub-sequences and the corresponding in-well monitoring data sub-sequences. For example, the greater a count of environmental information sub-sequences that can be matched to the in-well monitoring data sub-sequence, and the greater the matching degree between the environmental information sub-sequence and the corresponding in-well monitoring data sub-sequence, the greater the consistency of changes. By way of example, the consistency of changes S may be determined according to the following equation (2):

$$S = \sum_{i=1}^{n} l_i m_i \quad (2)$$

Wherein, n denotes the count of environmental information sub-sequences in the environmental information sequence, $l_i$ denotes the time duration of an i-th environmental information sub-sequence, and $m_i$ denotes the matching degree between the i-th environmental information sub-sequence and the corresponding in-well monitoring data sub-sequence.

In some embodiments of the present disclosure, by segmenting the environmental information sequence into the plurality of environmental information sub-sequences based on the characteristic of changes of the environment outside the gas pipe well and matching the plurality of environmental information sub-sequences with the corresponding in-well monitoring data sub-sequences, the consistency of changes can be determined more accurately, allowing for a more accurate assessment of the consistency of changes between the environments inside and outside the pipe well, and thus making subsequent determination of the performance integrity degree more consistent with actual conditions.

In some embodiments, the processor may determine the performance integrity degree based on the consistency of changes. For example, an inverse of the consistency of changes may be determined as the performance integrity degree.

In some embodiments of the present disclosure, the performance integrity degree of the gas pipe well is determined based on the consistency of changes in the environments inside and outside the pipe well. The performance integrity degree of the gas pipe well is determined by considering the change characteristic of the environments inside and outside the pipe well and considering impact of the environment outside the pipe well on the environment inside the gas pipe well, so that the subsequent determination of the in-well risk value is more consistent with actual conditions.

In some embodiments, the processor may determine a well-cover integrity degree based on a sequence of light data in the gas pipe well, and determine the performance integrity degree based on the well-cover integrity degree.

In some embodiments, the sequence of light data in the gas pipe well may be acquired by a light sensor mounted within the pipe well.

The well-cover integrity degree refers to the degree to which a well cover is intact. For example, when the well cover is broken or not tightly sealed, the corresponding well-cover integrity degree is lower.

In some embodiments, the processor may use the sequence of light data in the gas pipe well from a day when the well cover was intact (e.g., when the well cover was first installed) as a reference light, and compare a subsequently obtained sequence of light data in the gas pipe well with the reference light to determine the well-cover integrity degree. For example, the well-cover integrity degree corresponding to the reference light may be set to a maximum value (e.g., 100). When a light intensity inside the pipe well is stronger than a light intensity outside the pipe well and the reference light at the same time period, the maximum value of the well-cover integrity degree may be adjusted down based on a preset algorithm, and the stronger the light is, the more the maximum value is adjusted down, resulting a lower well-cover integrity degree. The preset algorithm may be set manually. The light intensity outside the pipe well may be obtained by a light sensor placed outside the pipe well.

In some embodiments, the performance integrity degree may be positively correlated with the well-cover integrity degree, i.e., the higher the well-cover integrity degree is, the higher the performance integrity degree is.

In some embodiments, the performance integrity degree determined based on the well-cover integrity degree may be validated and complemented with the performance integrity degree determined by the other manners described previously. For example, the processor may designate one of the previously determined performance integrity degree and the performance integrity degree determined based on the well-cover integrity degree as the final performance integrity degree depending on a situation. As another example, the processor may determine the final performance integrity degree by weighted averaging based on the performance integrity degree determined by the well-cover integrity degree and the performance integrity degree determined as described in the foregoing, and a weight may be manually preset.

In some embodiments of the present disclosure, by determining the well-cover integrity degree based on the sequence of light data in the gas pipe well and subsequently determining the performance integrity degree, an isolation effect of the well cover on the environments inside and outside the well is considered. On the basis of the above determined performance integrity degree, the impact of the well cover integrity degree on the performance of the pipe well is also considered, thereby facilitating a more accurate and reasonable determination of the performance integrity degree of the gas pipe well.

The pipe well location characteristic is a location feature of the pipe well relative to a surrounding environment. For example, the pipe well location characteristic may be that the pipe well location is located at a higher or lower position relative to the surrounding terrain. In some embodiments, the processor may determine the pipe well location characteristic based on topographical data for a region where the gas pipe well is located. When the pipeline well is located lower relative to the surrounding environment, water is more likely to accumulate at the location of the pipe well, and a risk of well-wall immersion is higher.

Referring to FIG. 3, in some embodiments, the processor may determine, using the risk assessment model 350, the well risk value based on the performance integrity degree 330, the pipe well location characteristic 340, the environmental information sequence 310, and the in-well monitoring data sequence 320. In some embodiments, the risk assessment model is a machine learning model, e.g., a Neural Networks (NN) model, a Deep Neural Networks (DNN) model, or the like.

Referring to FIG. 3, in some embodiments, the risk assessment model 350 may include an immersion layer 351 and a corrosion layer 352. The immersion layer 351 may be an NN model, a DNN model, or the like. An input of the immersion layer 351 may include the performance integrity degree 340, the pipe well location characteristic 330, and the environmental information sequence 310, and an output of the immersion layer 351 may include a well-wall immersion risk value 361. The corrosion layer 352 may be an NN model, DNN model, or the like. An input of the corrosion layer 352 may include the well-wall immersion risk value 361 and the in-well monitoring data sequence 320, and an output of the corrosion layer 352 may include a well-wall corrosion risk value 362. More descriptions of the in-well risk value, the well-wall immersion risk value, and the well-wall corrosion risk value may be found in the related description of FIG. 2.

In some embodiments, the processor may obtain the risk assessment model based on a large count of first training samples with first labels through training by various feasible training manners. For example, the risk assessment model may be obtained by joint training of the immersion layer and the corrosion layer.

In some embodiments, the first training samples may include a sample performance integrity degree of a sample gas pipe well, a sample pipe well location characteristic, a sample environmental information sequence, and a sample in-well monitoring data sequence. The first training samples may be obtained based on historical monitoring data.

In some embodiments, the first labels may include the well-wall immersion risk value and the well-wall corrosion risk value for the sample gas pipe well. In some embodiments, the first label may be tagged by the system or manually based on a historical inspection record of the sample gas pipe well. For example, the well-wall immersion risk value of the sample gas pipe well may be labeled based on a water immersion situation in the historical inspection record. If the historical inspection record indicates an occurrence of immersion during an inspection, the more severe the immersion is, the higher the well-wall immersion risk value may be labeled; if no immersion is recorded, then the immersion risk value is labeled as 0. The well-wall corrosion risk value of the sample gas pipe well may be obtained based on a corrosion situation in the historical inspection record. If the historical inspection record shows an increase in the corrosion of each gas component at a particular inspection compared to the last inspection, the larger the increase, the higher the well-wall corrosion risk value may be labeled; if no change is recorded, then the well-wall corrosion risk value is labeled as 0. The historical inspection record includes the immersion and corrosion of the sample gas pipe well during a historical inspection.

In some embodiments, the joint training process may include: inputting the sample performance integrity degree, the sample pipe well location characteristic, and the sample environmental information sequence into an initial immersion layer to obtain a well-wall immersion risk value output from the initial immersion layer; inputting the well-wall immersion risk value, the sample in-well monitoring data sequence into the initial corrosion layer to obtain a well-wall corrosion risk value output from the initial corrosion layer; constructing a first loss function based on the sample data input to the initial immersion layer and the well-wall immersion risk value output from the initial immersion layer; constructing a second loss function based on the sample data input to the initial corrosion layer and the well-wall corrosion risk value output from the initial corrosion layer; and iteratively updating model parameters of the initial immersion layer and the initial corrosion layer based on the first and second loss functions, respectively, until a preset condition is satisfied, and then the training is completed. The preset condition may be that the first and second loss functions are both less than a threshold or converge, a count of training iterations reaching a threshold, or the like.

In some embodiments of the present disclosure, the environmental information sequence and the in-well monitoring data sequence are utilized to determine the performance integrity degree of the gas pipe well, and combined with the pipe well location characteristic, the in-well risk value is determined by the risk assessment model. This approach can simultaneously consider the performance and location characteristic of the pipe well and changes of the environments inside and outside the pipe well, thus providing a more reasonable and comprehensive evaluation of the in-well risk value and laying a solid foundation for subsequent operations such as the determination of the inspection program.

FIG. 4 is a schematic diagram illustrating determining of an impact degree of a gas component according to some embodiments of the present disclosure.

Referring to FIG. 4, in some embodiments, a processor may determine weatherability 430 of the gas component based on a historical inspection record 411 of the gas component, historical operational data 412, gas component information 413, and a historical in-well risk value 414 of a gas pipe well, and determine an impact degree 450 of the gas component based on the weatherability 430 and an updated in-well risk value 440. More descriptions of the historical inspection record may be found in FIG. 3 and the related descriptions thereof.

The historical operational data refers to operation data of the gas component over a historical time period. For example, the historical operational data may include data such as whether a monitoring component was able to accurately execute a monitoring parameter, whether the gas component worked properly, data on an occurrence time and severity of an abnormality in the gas component, or the like.

The gas component information is information related to the gas component. For example, the gas component information may include a component type of the gas component (e.g., a metering device, a temperature sensor, etc.), a material of the component (e.g., stainless steel, titanium, etc.), a component usage duration, a designed service life of the gas component, etc. In some embodiments, the processor may obtain the gas component information through a factory inspection report of the gas component, a historical installation record, or the like.

The historical in-well risk value refers to the in-well risk value for the gas pipe well over a historical time period. For example, the historical in-well risk value may include a pre-update in-well risk value. More descriptions of the in-well risk value and the updated in-well risk value may be found in FIG. 2 and the related descriptions thereof.

The weatherability of the gas component refers to an ability of the gas component to resist changes in a surrounding (i.e., inside the pipe well) environment. The higher the weatherability of the gas component is, the higher the ability of the gas component to resist changes in the surrounding environment.

In some embodiments, the weatherability may include waterproof weatherability, corrosion weatherability, or the like.

The waterproof weatherability refers to an ability of the gas component to resist water immersion in the well wall. The lower the waterproof weatherability is, the higher the likelihood of the gas component becoming immersed under a given well-wall immersion risk value.

The corrosion weatherability refers to an ability of the gas component to resist corrosion. The lower the corrosion weatherability is, the higher the likelihood of the gas component being corroded under a given well-wall corrosion risk value.

In some embodiments, the processor may determine the weatherability of the gas component in a variety of ways based on the historical inspection record of the gas component, the historical operational data, the gas component information, and the historical in-well risk value of the gas pipe well. For example, based on the historical inspection records, the historical operational data, and the gas component information of a plurality of gas components of a plurality of gas pipe wells, and the historical in-well risk values of the plurality of gas pipe wells, the processor may determine the well-wall immersion risk value and the well-wall corrosion risk value corresponding to each of the plurality of gas components as the waterproof weatherability and the corrosion weatherability of the gas component, respectively. In some embodiments, the processor may construct a preset table in the manner described above and based on the historical inspection record of a current gas component, the historical operational data, the gas component information, and the historical in-well risk value of the current gas pipe well, determine the weatherability of the current gas component by querying the preset table.

It should be noted that using a well-wall immersion risk value as the waterproof weatherability of a gas component means that the gas component is highly likely to be immersed in water when that well-wall immersion risk value is reached; using a well-wall corrosion risk value as the corrosion weatherability of a gas component means that a corrosion rate of the gas component is highly likely to accelerate when the well-wall corrosion risk value is reached.

Referring to FIG. 4, in some embodiments, the processor may determine the weatherability 430 of the gas component based on the historical inspection record 411 of the gas component, the historical operational data 412, the gas component information 413, and the historical in-well risk value 414 of the gas pipe well using a weatherability model 420.

The weatherability model is a model configured to determine the weatherability of the gas component. In some embodiments, the weatherability model may be a machine learning model, such as an NN model, a recurrent neural network (RNN) model, or the like.

In some embodiments, an input of the weatherability model may include the historical inspection record of the gas component, the historical operational data, the gas component information, and the historical in-well risk value of the gas pipe well, and an outputs of the weatherability model may include the weatherability of the gas component. In some embodiments, the output of the weatherability model may include the waterproof weatherability and the corrosion weatherability of the gas component.

In some embodiments, the processor may obtain the weatherability model through training based on a second training sample with a second label in various ways. For example, the training may be conducted based on gradient descent.

In some embodiments, the second training sample may be obtained from historical data. The second training sample includes a sample inspection record of a sample gas component, sample operational data, sample gas component information, and a sample in-well risk value of the gas pipe well where the sample gas component is located. The second label may include the waterproof weatherability and the corrosion weatherability of the sample gas component. In some embodiments, the second label may be assigned by the system or manually based on the analysis of a historical inspection. For example, the processor may query the historical inspection record for an occurrence of water immersion in the sample gas component and determine a historical well-wall immersion risk value corresponding to a time when the occurrence of water immersion began as the waterproof weatherability of the sample gas component. As another example, the processor may query the historical inspection record for corrosion situations recorded during a plurality of inspections, determine corrosion rates of the sample gas component under a plurality of historical well-wall corrosion risk values, and determine a historical well-wall corrosion risk value corresponding to a corrosion rate that exceeds a reference rate as the corrosion weatherability of the sample gas component. The reference rate refers to the corrosion rate of the gas component at standard temperature and humidity, which may be preset by a technician based on historical data or prior knowledge.

In some embodiments of the present disclosure, by processing the historical inspection record, the historical operational data, the gas component information, and the historical in-well risk value through the weatherability model, the weatherability of the gas component can be determined. The self-learning capability of the machine learning model can be used to identify a pattern from a large amount of historical data, thereby improving the accuracy and efficiency of determining the weatherability and making subsequent determination of the impact degree more reasonable.

In some embodiments, the processor may determine the impact degree of the gas component in various ways based on the weatherability of the gas component and the updated in-well risk value. For example, based on the equation (1), the well-wall immersion risk value p1 may be replaced with a difference between an updated well-wall immersion risk value r1 and a waterproof weatherability u1, and the well-wall corrosion risk value p2 may be replaced with a difference between an updated well-wall corrosion risk value r2 and a corrosion weatherability u2. Merely by way of example, the impact degree I of the gas component may be calculated using the following equation (3):

$$I = k1*(r1-u1)+k2*(r2-u2) \tag{3}$$

Wherein u1 and u2 denote the waterproof weatherability and the corrosion weatherability, respectively, and r1 and r2 denote the updated well-wall immersion risk value and the updated well-wall corrosion risk value, respectively. More descriptions of the other symbols within the equation may be found in the related description of the equation (1) in FIG. 2.

In some embodiments, the processor may determine the impact degree of the gas component based on a cumulative value of excess portions where in-well risk values exceed the weatherability of the gas component in a plurality of time periods. The plurality of time periods may be determined with reference to a related description of the manner in which the environmental information sequence is segmented in FIG. 3.

In some embodiments, the processor may determine an average of a plurality of in-well risk values determined within each of the plurality of time periods as the in-well risk value of the time period.

In some embodiments, the processor may determine, within the plurality of periods, a product of the excess portion for each of the plurality of periods multiplied by a duration of the time period, then accumulate the products corresponding to the plurality of periods to obtain the cumulative value of the excess portion. In some embodiments, the greater the cumulative value of the excess portion, the greater the impact degree of the gas component. In some embodiments, the processor may directly determine the cumulative value of the excess portion as the impact degree of the gas component. Calculations may be performed separately for the well-wall immersion risk value and the well-wall corrosion risk value. For example, an impact degree J of the gas component may be determined using the following equation (4) based on the well-wall immersion risk values of the plurality of time periods and the waterproof weatherability of the gas component:

$$J = \sum_{i=1}^{n} (j_i - l)*t_i \tag{4}$$

Wherein n denotes a total count of time periods of the above plurality of time periods, $j_i$ denotes the well-wall immersion risk value corresponding to an i-th time period, l denotes the waterproof weatherability of the gas component, and $t_i$ denotes the duration of the i-th time period. The impact degree of the gas component may be determined based on the well-wall corrosion risk value in a similar manner, which is not described herein.

In some embodiments, if the in-well risk values over the plurality of time periods change continuously, the processor may calculate the cumulative value by integrating the excesses portions described above over time to determine the impact degree of the gas component. For example, the impact degree J of the gas component may be determined by integrating the well-wall immersion risk values and the waterproof weatherability of the gas component over the plurality of time periods using the following equation (5):

$$J = \int_0^T (j(t)-l)dt \tag{5}$$

Wherein T denotes a sum of the durations of the plurality of time periods, j(t) denotes the well-wall immersion risk value corresponding to a time t, and l denotes the weatherability of the gas component. Similarly, the impact degree corresponding to the corrosion risk may be calculated in a similar way, which will not be repeated here.

The impact of the in-well risk value on the gas component is cumulative. For example, a failure of the gas component due to water immersion, corrosion, etc., is caused by the continuous inundation of water in the pipe well or exposure a corrosive environment. Accordingly, in some embodiments of the present disclosure, the excess portions of the in-well risk values of the weatherability of the gas component over the plurality of time periods is accumulated to determine the impact degree of the gas component, which allows for a more accurate analysis of the impact degree of the gas component by comparing in-well risk values under different environmental conditions with the corresponding weatherability over different time periods.

In some embodiments of the present disclosure, the weatherability of the gas component is determined based on the historical inspection record of the gas component, the historical operational data, the gas component information, and the historical in-well risk value of the gas pipe well. Then, combined with the updated in-well risk value, the impact degree of the gas component is determined comprehensively and precisely, allowing for the subsequent determination of a more reasonable inspection program.

One or more embodiments of the present disclosure further provide a device for safety management of the gas pipe well based on the smart gas IoT. The device comprises at least one processor and at least one memory for storing one or more sets of computer instructions. The at least one processor is used to execute at least a portion of the one or more sets of computer instructions to implement the method for safety management of the gas pipe well based on the smart gas IoT as described in any of the above embodiments.

One or more embodiments of the present disclosure further provide a non-transitory computer-readable storage medium. The storage medium stores one or more set of computer instructions, and when a computer reads the one or more set of computer instructions in the storage medium, the computer executes the method for safety management of the gas pipe well based on the smart gas IoT as described in any of the above embodiments.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this disclosure are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for safety management of a gas pipe well based on a smart gas Internet of Things (IoT), wherein the method is executed by a processor, and the method comprises:

obtaining an environmental information sequence of the gas pipe well and an in-well monitoring data sequence by controlling a monitoring component according to a monitoring parameter based on the smart gas IoT, and storing the environmental information sequence of the gas pipe well and the in-well monitoring data sequence in a storage unit;

determining an in-well risk value based on the environmental information sequence and the in-well monitoring data sequence, wherein the in-well risk value includes a well-wall immersion risk value and a well-wall corrosion risk value, and the in-well risk value is determined by:

determining consistency of changes between an environment inside the gas pipe well and an environment outside the gas pipe well based on the environmental information sequence and the in-well monitoring data sequence;

determining a performance integrity degree of the gas pipe well based on the consistency of changes; and determining the in-well risk value through a risk assessment model based on the performance integrity degree, a pipe well location characteristic, the environmental information sequence, and the in-well monitoring data sequence, the risk assessment model being a machine learning model, wherein the risk assessment model includes an immersion layer and a corrosion layer, the immersion layer is configured to process the performance integrity degree, the pipe well location characteristic, and the environmental information sequence to obtain the well-wall immersion risk value, and the corrosion layer is configured to process the well-wall immersion risk value and the in-well monitoring data to obtain the well-wall corrosion risk value;

adjusting the monitoring parameter in response to determining that the in-well risk value exceeds a risk threshold and updating the in-well risk value based on the adjusted monitoring parameter;

determining an impact degree of a gas component based on the updated in-well risk value;

determining a pipe well inspection program based on the impact degree of the gas component and generating a corresponding pipe well inspection instruction to be sent to an inspection terminal; and adjusting the monitoring parameter and clearing expired data in the storage unit based on an inspection result on the pipe well inspection instruction by an inspector.

2. The method according to claim 1, wherein the determining consistency of changes between an environment inside the gas pipe well and an environment outside the gas pipe well based on the environmental information sequence and the in-well monitoring data sequence includes:

segmenting the environmental information sequence to obtain a plurality of environmental information sub-sequences based on a characteristic of changes of the environment outside the gas pipe well in the environmental information sequence;

determining, based on the plurality of environmental information sub-sequence and the in-well monitoring data sequence, a plurality of in-well monitoring data sub-sequences corresponding to the plurality of environmental information sub-sequences, respectively; and determining the consistency of changes based on a matching degree between the plurality of environmental data sub-sequences and the plurality of in-well monitoring data sub-sequences.

3. The method of claim 1, wherein the method further comprises:

determining a well-cover integrity degree based on a sequence of light data in the gas pipe well; and determining the performance integrity degree based on the well-cover integrity degree.

4. The method of claim 1, wherein the determining an impact degree of a gas component based on the updated in-well risk value includes:

determining weatherability of the gas component based on a historical inspection record of the gas component, historical operational data, gas component information, and a historical in-well risk value of the gas pipe well; and determining the impact degree of the gas component based on the weatherability of the gas component and the updated in-well risk value.

5. The method of claim 4, wherein the determining weatherability of the gas component based on a historical inspection record of the gas component, historical operational data, gas component information, and a historical in-well risk value of the gas pipe well includes:

determining the weatherability of the gas component using a weatherability model based on the historical inspection record, the historical operating data, the gas component information, and the historical in-well risk value, the weatherability model being a machine learning model.

6. The method of claim 1, wherein the determining a pipe well inspection program based on the impact degree of the gas component includes:

determining a pipe well inspection priority based on the impact degree of the gas component; and determining the pipe well inspection program based on the pipe well inspection priority.

7. A system for safety management of a gas pipe well based on a smart gas Internet of Things (IoT), wherein the system comprises a smart gas user platform, a smart gas service platform, a smart gas device management platform, a smart gas sensing network platform, and a smart gas object platform, wherein the smart gas device management platform is configured to:

obtain an environmental information sequence of a gas pipe well and an in-well monitoring data sequence by controlling a monitoring component according to a monitoring parameter based on the smart gas IoT, and store the environmental information sequence of the gas pipe well and the in-well monitoring data sequence in a storage unit;

determine an in-well risk value based on the environmental information sequence and the in-well monitoring data sequence, wherein the in-well risk value includes a well-wall immersion risk value and a well-wall corrosion risk value, and to determine the in-well risk value, the smart gas device management platform is further configured to:

determine consistency of changes between an environment inside the gas pipe well and an environment outside the gas pipe well based on the environmental information sequence and the in-well monitoring data sequence;

determine a performance integrity degree of the gas pipe well based on the consistency of changes; and determine the in-well risk value through a risk assessment model based on the performance integrity degree, a pipe well location characteristic, the environmental information sequence, and the in-well monitoring data sequence, the risk assessment model being a machine learning model, wherein the risk assessment model includes an immersion layer and a corrosion layer, the immersion layer is configured to process the performance integrity degree, the pipe well location characteristic, and the environmental information sequence to obtain the well-wall immersion risk value, and the corrosion layer is configured to process the well-wall immersion risk value and the in-well monitoring data to obtain the well-wall corrosion risk value;

adjust the monitoring parameter in response to determining that the in-well risk value exceeds a risk threshold and update the in-well risk value based on the adjusted monitoring parameter;

determine an impact degree of a gas component based on the updated in-well risk value;

determine a pipe well inspection program based on the impact degree of the gas component and generate a corresponding pipe well inspection instruction to be sent to an inspection terminal; and adjust the monitoring parameter and clear expired data in the storage unit based on an inspection result of the pipe well inspection instruction by an inspector.

8. The system of claim 7, wherein the smart gas device management platform is configured to:

segment the environmental information sequence to obtain a plurality of environmental information sub-sequences based on a characteristic of changes of the environment outside the gas pipe well in the environmental information sequence;

determine, based on the plurality of environmental information sub-sequence and the in-well monitoring data sequence, a plurality of in-well monitoring data sub-sequences corresponding to the plurality of environmental information sub-sequences, respectively; and determine the consistency of changes based on a matching degree between the plurality of environmental data sub-sequences and the plurality of in-well monitoring data sub-sequences.

9. The system of claim 7, wherein the smart gas device management platform is configured to:
   determine a well-cover integrity degree based on a sequence of light data in the gas pipe well; and
   determine the performance integrity degree based on the well-cover integrity degree.

10. The system of claim 7, wherein the smart gas device management platform is configured to:
   determine weatherability of the gas component based on a historical inspection record of the gas component, historical operational data, gas component information, and a historical in-well risk value of the gas pipe well; and
   determine the impact degree of the gas component based on the weatherability of the gas component and the updated in-well risk value.

* * * * *